(No Model.) 3 Sheets—Sheet 1.

P. PFLEIDERER & H. WERNER.
BAKING OVEN.

No. 487,638. Patented Dec. 6, 1892.

(No Model.) 3 Sheets—Sheet 2.
P. PFLEIDERER & H. WERNER.
BAKING OVEN.

No. 487,638. Patented Dec. 6, 1892.

THE NORRIS PETERS CO., PHOTO-LITHO., WASHINGTON, D. C.

(No Model.) 3 Sheets—Sheet 3.

P. PFLEIDERER & H. WERNER.
BAKING OVEN.

No. 487,638. Patented Dec. 6, 1892.

United States Patent Office.

PAUL PFLEIDERER, OF LONDON, ENGLAND, AND HERMANN WERNER, OF CANNSTATT, NEAR STUTTGART, GERMANY.

BAKING-OVEN.

SPECIFICATION forming part of Letters Patent No. 487,638, dated December 6, 1892.

Application filed May 3, 1892. Serial No. 431,670. (No model.)

*To all whom it may concern:*

Be it known that we, PAUL PFLEIDERER, of London, in the county of Middlesex and Kingdom of Great Britain, and HERMANN WERNER, of Cannstatt, near Stuttgart, in the Kingdom of Würtemberg and German Empire, subjects of the King of Würtemberg, have invented a certain new and useful Improvement in Baking-Ovens, of which the following is a specification, reference being had to the accompanying drawings, in which like letters of reference designate similar parts.

This invention relates to improvements in the draw-plates or traveling baking-plates of intermittent continuous baking-ovens, such as those of Wieghorst, Aff, Jordans, Lorenz, and others. The whole baking plate or oven bottom of those ovens being mounted on wheels which run on rails fixed inside and outside the oven is capable of being drawn entirely out of the oven-chamber, the entire batch of baked bread is unloaded or "drawn," and the entire batch of unbaked dough-loaves is "set" or put on the oven bottom or draw-plate direct without using the so-called "peel" for such setting and drawing of the bread. The usual objections made by bakers to this class of ovens in which the baking-plate draws out in its full length into the bake-house are those of want of room, of the goods suffering by remaining for some time on a hot bottom without being at the same time exposed to a corresponding top heat until they are run into the oven, and of being difficult to handle when built in decks or stories one above the other. Our invention will remove these objections; and it consists in constructing the baking-surface, oven-bottom, or draw-plate in divisions or lengths movable one past the other, so that it may be drawn from or inserted into the baking-chamber in parts or sections one after the other.

Figure 1:
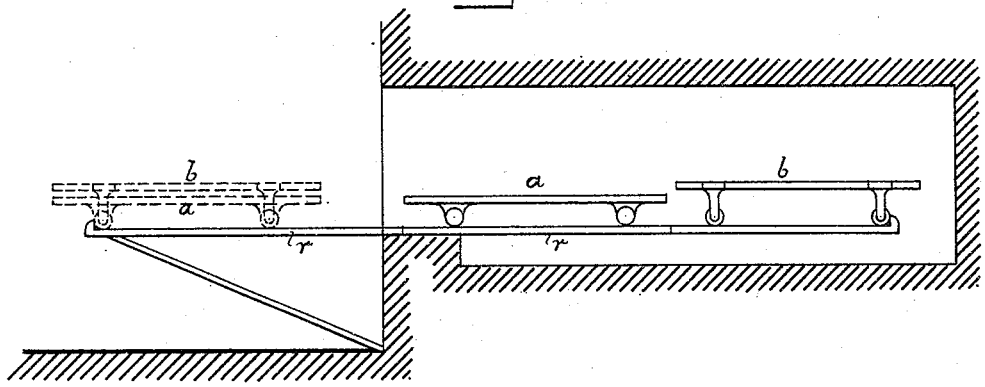
Figure 2:
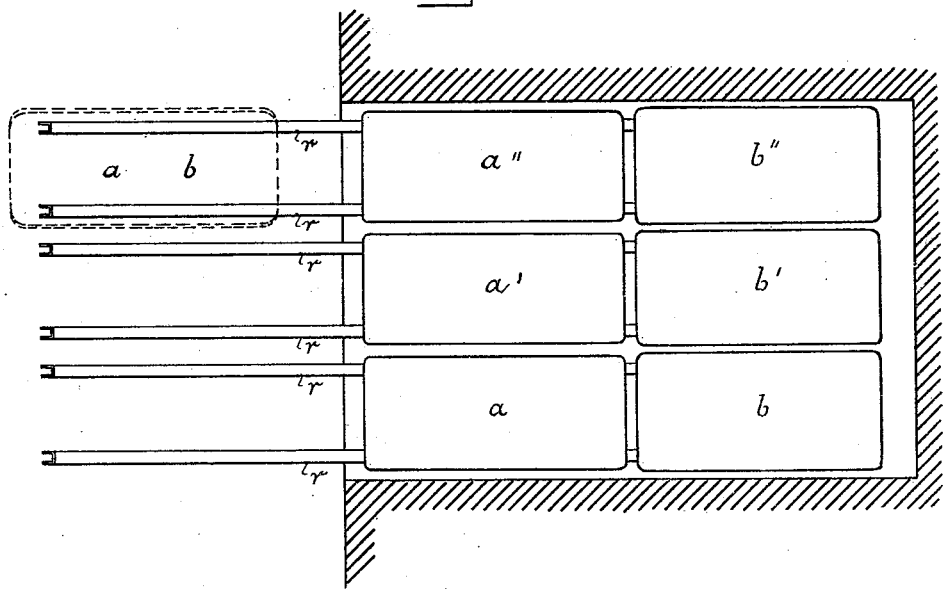
Figure 3:
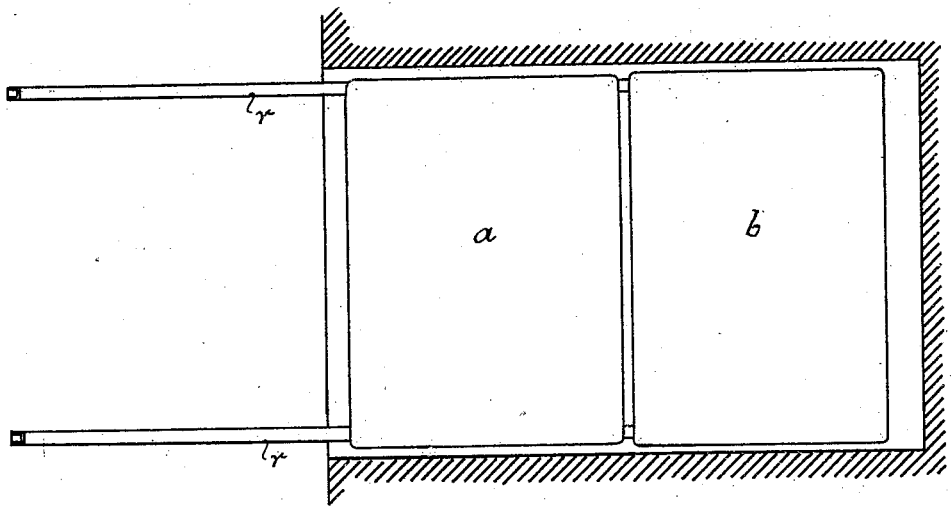
Figure 4:
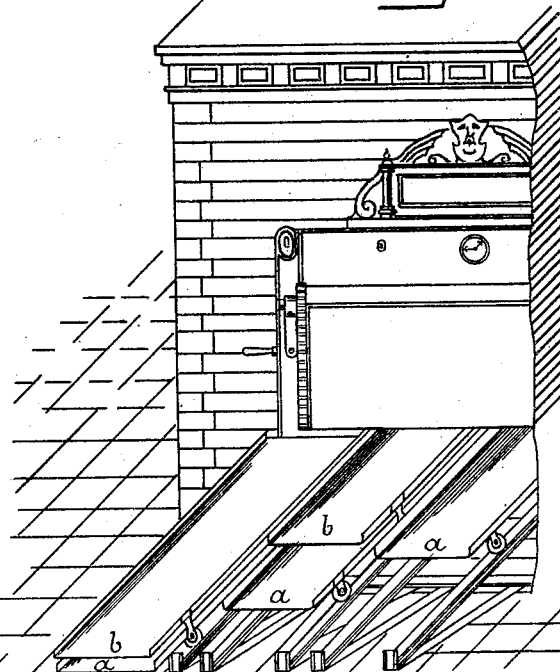
Figure 5:
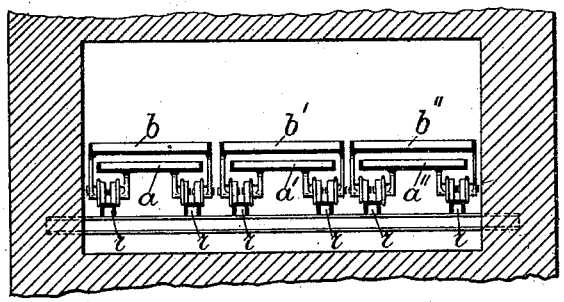

Figure 1 shows in longitudinal section the baking-chamber of an oven fitted with two rows $a$ and $b$ of such small draw-plates or divisions or parts of the whole baking-surface or draw-plate. Fig. 2 shows in horizontal section the same baking-chamber with the two rows $a$ and $b$, each row consisting of three small draw-plates $a\ a'\ a''$ and $b\ b'\ b''$, shown in plan view. Fig. 3 shows the same baking-chamber in horizontal section with two single or whole draw-plates A and B, each taking, respectively, the place of the three corresponding smaller plates $a\ a'\ a''$ and $b\ b'\ b''$. Fig. 4 is a perspective view of the two rows $a\ a'\ a''$ and $b\ b'\ b''$, partly drawn from the baking-chamber. The six small plates are shown in the position they take up when in the oven. The dotted lines indicate two of them $a$, and $b$, as they appear on the rails $r$ in front of oven when they are drawn out of the baking-chamber. If there were, as has hitherto been the custom, only one draw-plate comprising the entire available baking surface or space in the baking-chamber, it would when drawn out occupy double the length of room in front of the oven of what the same or nearly the same baking-surface requires if it is subdivided into or made up of two rows or lengths $a\ a'\ a''$ and $b\ b'\ b''$, or of two plates A and B, each being half the length only of the whole available baking-surface, the one farthest in the baking-chamber—viz., $b$ or B—being capable of running in and out clear of $a$ or A, respectively. Instead of two rows of half the length or depth each, three rows of one third or a larger number of smaller fraction might, of course, be employed. Fig. 5 shows a cross-section through baking-chamber with the six small draw-plates in position. The construction which allows B to run in and out over and past A is exactly the same as that of $b$ running over $a$. The wheels of $b$ and B are mounted on thin straps or brackets reaching down and having sufficient clearance between the neighboring plate or the wall of baking-chamber on the one side and the somewhat-narrower plates $a$ or A on the other side. The wheels of $b$ and B are guided by their flanges outside the broad rails, while those of $a$ and A have their flanges to work against the inner edges of the rails similar to railway-carriage wheels.

We do not claim a draw-plate on wheels or rollers or similar to Wieghorst's or Lorenz's, which move by other means into and from the baking-chamber as a whole or in parts of full length or depth, but What we do claim is—

A baking-oven having its draw-plate or baking-surface subdivided transversely into independent sections, which are movable one over another, so that the entire draw-plate or baking-surface can be withdrawn from or inserted into the oven in sections, substantially as described.

In testimony whereof we have signed our names to this specification in the presence of two subscribing witnesses.

PAUL PFLEIDERER.
HERMANN WERNER.

Witnesses as to Paul Pfleiderer:
W. LANGENBACH,
T. THOMAS.

Witnesses as to Hermann Werner:
C. SPEIGLER,
ERNST SCHLENCK.